United States Patent
Beck et al.

(10) Patent No.: US 9,574,625 B2
(45) Date of Patent: Feb. 21, 2017

(54) SAFETY LOCK DEVICE FOR PUMP-JACK

(71) Applicant: Atabec Safety Lock Corp., Rocky Mountain House (CA)

(72) Inventors: Michael Beck, Rocky Mountain House (CA); Daniel Atwater, Rocky Mountain House (CA)

(73) Assignee: ATABEC SAFETY LOCK CORP., Rocky Mountain House (CA)

( * ) Notice: Subject to any disclaimer, the term of this patent is extended or adjusted under 35 U.S.C. 154(b) by 494 days.

(21) Appl. No.: 14/042,713

(22) Filed: Sep. 30, 2013

(65) Prior Publication Data

US 2014/0238786 A1 Aug. 28, 2014

Related U.S. Application Data

(60) Provisional application No. 61/771,049, filed on Feb. 28, 2013.

(51) Int. Cl.
*B62C 7/02* (2006.01)
*F16D 63/00* (2006.01)

(52) U.S. Cl.
CPC .................. *F16D 63/006* (2013.01)

(58) Field of Classification Search
CPC ....... B66B 5/04; B66B 11/0446; B60T 1/005; B23Q 16/04
USPC ..................... 188/31, 69; 187/254
See application file for complete search history.

(56) References Cited

U.S. PATENT DOCUMENTS

| | | | | |
|---|---|---|---|---|
| 1,875,096 A | * | 8/1932 | Miller | B23Q 16/04 188/69 |
| 3,003,587 A | * | 10/1961 | Garrett | F16D 55/224 188/31 |
| 5,202,539 A | * | 4/1993 | Lamb | B66B 5/04 187/254 |
| 5,669,469 A | * | 9/1997 | Ericson | B66B 11/0446 187/254 |
| 5,992,576 A | * | 11/1999 | Berg | B60T 1/005 180/273 |
| 6,164,420 A | * | 12/2000 | Fleischer | B60T 1/005 188/60 |
| 7,267,201 B2 | * | 9/2007 | Ito | B66B 5/22 187/366 |
| 7,757,832 B2 | * | 7/2010 | Sauter | B60T 1/005 188/31 |
| 8,025,510 B2 | * | 9/2011 | Bolshakov | H01R 13/443 439/136 |

* cited by examiner

*Primary Examiner* — Christopher Schwartz
(74) *Attorney, Agent, or Firm* — Sander R. Gelsing

(57) ABSTRACT

In one aspect the invention provides a safety lock device, for use with a pump-jack having a gear box and at least one rotating member, the safety lock device comprising an engagement member suitable for securely engaging the rotating member to prevent further substantial rotation of said rotating member and a mounting frame to mount the safety lock device to the gear box. The engagement member may be actuated between a locked position and an unlocked position.

10 Claims, 13 Drawing Sheets

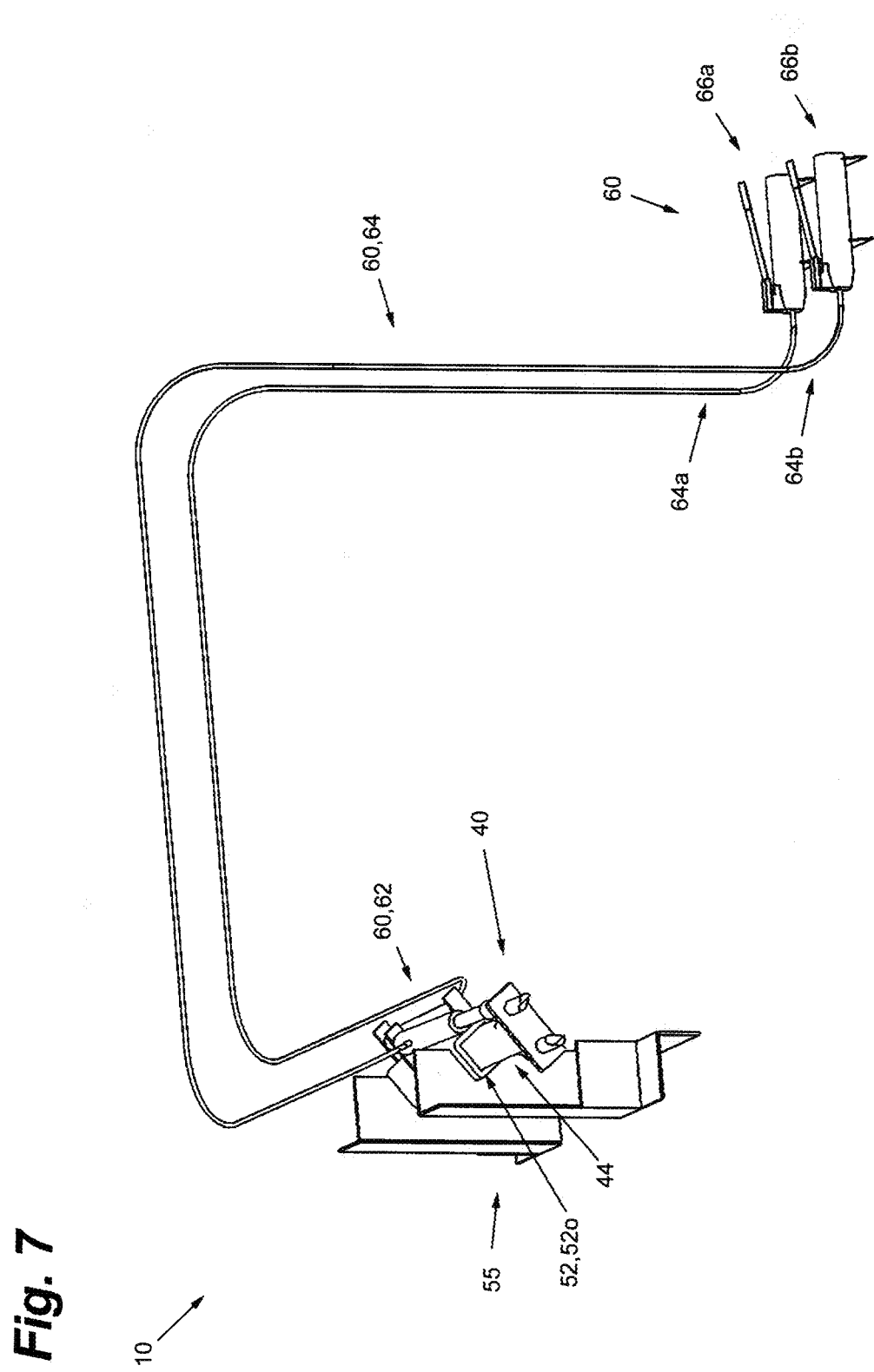

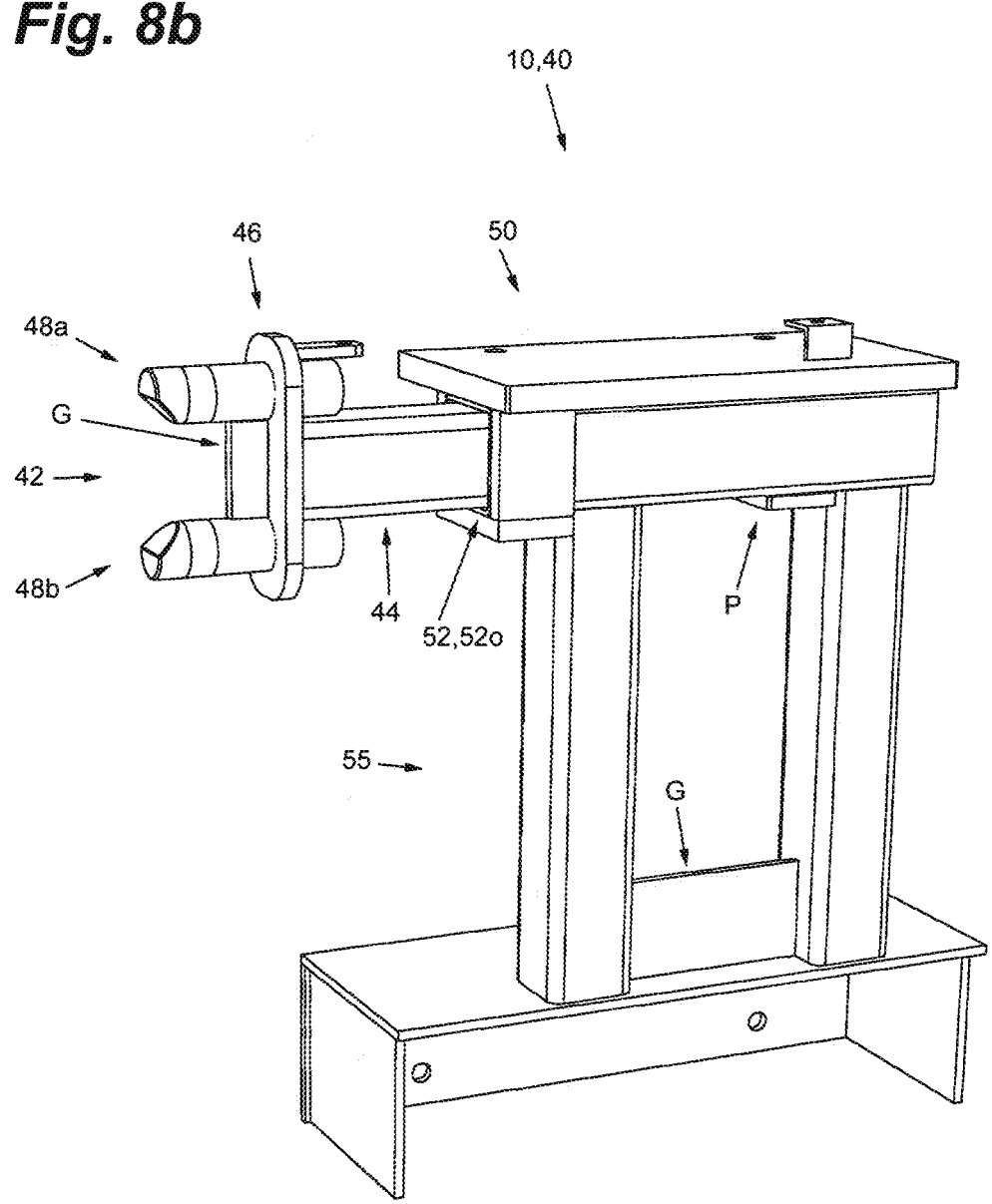

SAFETY LOCK DEVICE FOR PUMP-JACK

CROSS REFERENCE TO RELATED APPLICATION

This application is a regular application of U.S. Provisional Patent Application Ser. No. 61/771,049 filed Feb. 28, 2013 and entitled, "SAFETY LOCK DEVICE FOR PUMP-JACK", the entirety of which is incorporated herein by reference.

FIELD OF THE INVENTION

This invention relates generally to safety devices used to secure equipment in place and enable the performance of maintenance or other work on such equipment. More particularly, the invention relates to lock devices used to preclude movement of a loaded oil well pumping unit and thereby permit work on it to be performed safely.

BACKGROUND OF THE INVENTION

The background information discussed below is presented to better illustrate the novelty and usefulness of the present invention. This background information is not admitted prior art.

In the petroleum industry, a variety of methods are used for extracting oil from underground reservoirs. Perhaps one of the most common of these methods is an oil well pumping unit known as the "walking beam" or "pump-jack" type. These pump-jack pumping units, also called nodding donkey, pumping unit, horsehead pump, rocking horse, beam pump, dinosaur, sucker rod pump (SRP), grasshopper pump, thirsty bird, jack pump, popping johnny or walking beam pump (collectively referred to herein as pump-jack or pump-jacks) is the overground drive for a reciprocating piston pump down-hole in an oil well. Pump-jacks are typically used to mechanically lift liquid out of the well if there is not enough bottom-hole pressure for the liquid to flow all the way to the surface. A pump-jack converts the rotary mechanism of a motor to a vertical reciprocating motion to drive the pump shaft, and is exhibited in the characteristic nodding motion.

Modern pump-jacks are powered by a prime mover. This is may be an electric motor, but internal combustion engines are used in isolated locations without access to electricity. Common off-grid pump-jack engines run on casing gas produced from the well, but pump-jacks have been run on many types of fuel, such as propane and diesel. In harsh climates such motors and engines may be housed in a shack for protection from the elements.

The prime mover of the pump-jack runs a set of pulleys or sheaves, via a belt, to the transmission or gear-box which drives a pair of cranks, generally with counterweights on them to assist the motor in lifting the heavy string of rods. The cranks raise and lower one end of an I-beam, or pump arm, which is free to move on an A-frame. On the other end of the beam, there is a curved metal box called a Horse Head or Donkeys Head, so named due to its appearance. A cable made of steel or fiberglass, called a bridle, connects the horse head to the polished rod, a piston that passes through the stuffing box down the well to actuate the down-hole pump. The polished rod has a close fit to the stuffing box, letting it move in and out of the tubing without fluid escaping. The bridle follows the curve of the horse head as it lowers and raises to create a nearly vertical stroke. The polished rod is connected to a long string of rods called sucker rods, which run through the tubing to the down-hole pump, usually positioned near the bottom of the well.

In the course of regular maintenance or modification of a pump-jack, the pump arm is typically operated through its up-down cycle until the pump arm brings the pump head down to its lowest position, closest to the ground. At this point the unit is stopped and a safety hand brake may be applied. Typically the safety brake is attached to an axle that is common to the pulley or sheave on the gear box (i.e. with the sheave on one side of the gear-box and the brake attached to the axle at the other side of the gear-box). However, such a brake is normally a drum brake which relies on friction to prevent the various (heavy) components of a pump-jack from moving. Such drum brakes are known to slip, thereby creating a safety hazard. As such, in current practice, a chain may also be passed over the pump arm, and/or through the sheave at the gear-box, and then secured to the platform or base of the pump unit using a boomer.

The addition of this secured chain provides some added degree of safety, should the brake mechanism fail, because it does not rely on friction but, rather, locks the moving component directly. However, this method of using a chain also has disadvantages including: (i) that an operator has to enter physically close to the pump-jack to apply the chain, thereby placing him or herself inside the rotation area, which area is often fenced off or enclosed for safety reasons because of the heavy weights and large moving equipment involved; and (ii) that a chain through the sheave and then secured to the base will impede or prevent replacement of the belt, should such replacement be part of the pump-jack maintenance.

Therefore, what is needed is a safety device for a pump-jack that does not rely on friction to stop the moving component(s) of a pump-jack and which can be actuated to lock and unlock the pump-jack remotely, i.e. from outside the rotation area.

SUMMARY OF THE INVENTION

The present invention is directed to overcoming the prior art deficiencies in pump-jack safety devices.

In one aspect the invention provides a safety lock device, for use with a pump-jack having a gear box and at least one rotating member, the safety lock device comprising an engagement member suitable for securely engaging the rotating member to prevent further substantial rotation of said rotating member and a mounting frame to mount the safety lock device to the gear box. The engagement member may be actuated between a locked position and an unlocked position.

BRIEF DESCRIPTION OF THE DRAWINGS

Referring to the drawings, several aspects of the present invention are illustrated by way of example, and not by way of limitation, in detail in the figures, wherein:

FIG. 1b is another (other) side perspective view of the pump-jack and the embodiment of the safety lock device of FIG. 1a;

FIG. 2 is a close-up side perspective view of the embodiment of the safety lock device of FIG. 1a;

FIG. 7 is a side perspective view of the embodiment of the safety lock device of FIG. 1a;

FIG. 8b is a rear perspective view of the embodiment of the safety lock device of FIG. 8a;

FIGS. 8c and 8d are rear and rear-sectioned perspective views of components the embodiment of the safety lock device of FIG. 8a;

FIG. 10c is a perspective view of the embodiment of the safety lock device of FIG. 10a.

DETAILED DESCRIPTION OF THE PREFERRED EMBODIMENTS

Figure 1A:
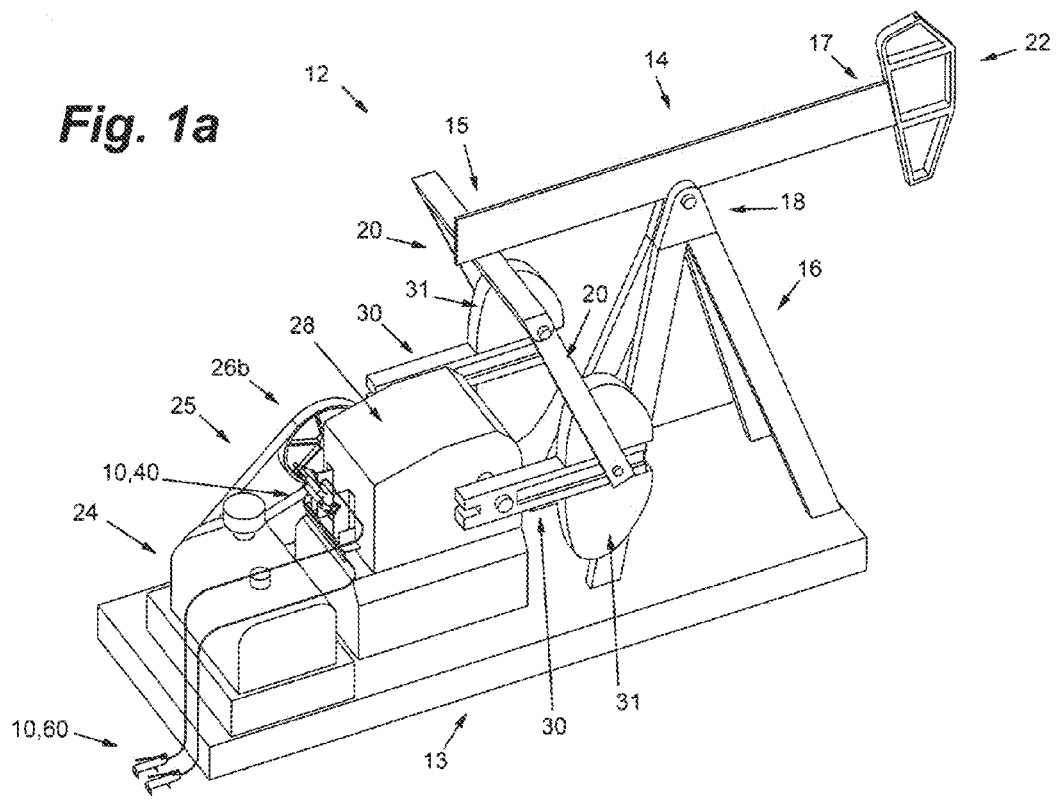
FIG. 1a is a side perspective view of a conventional pump-jack and illustrating a preferred embodiment of the safety lock device mounted thereon.
Figure 1B:
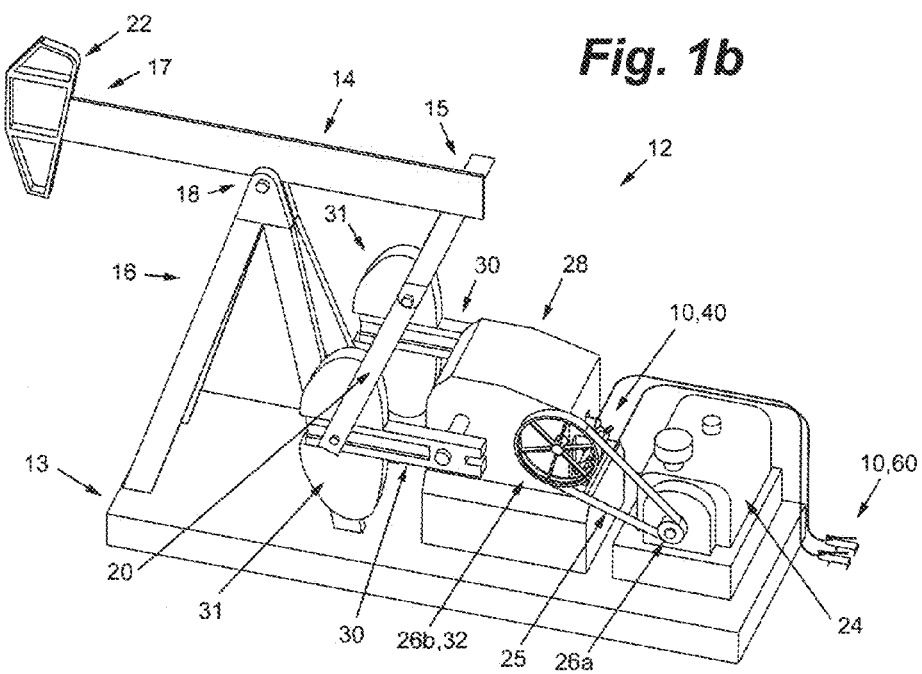
Figure 2:
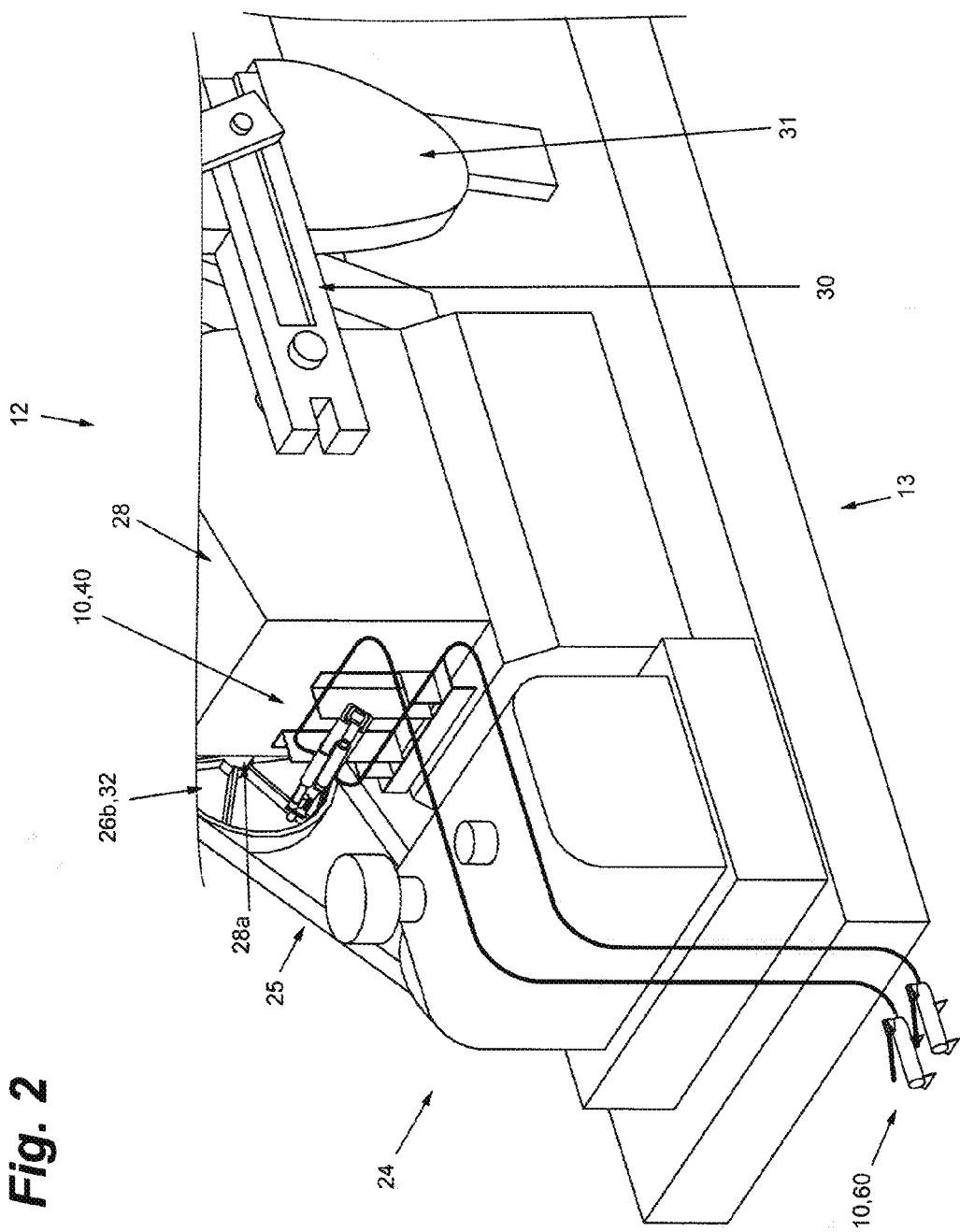
Figure 3A:
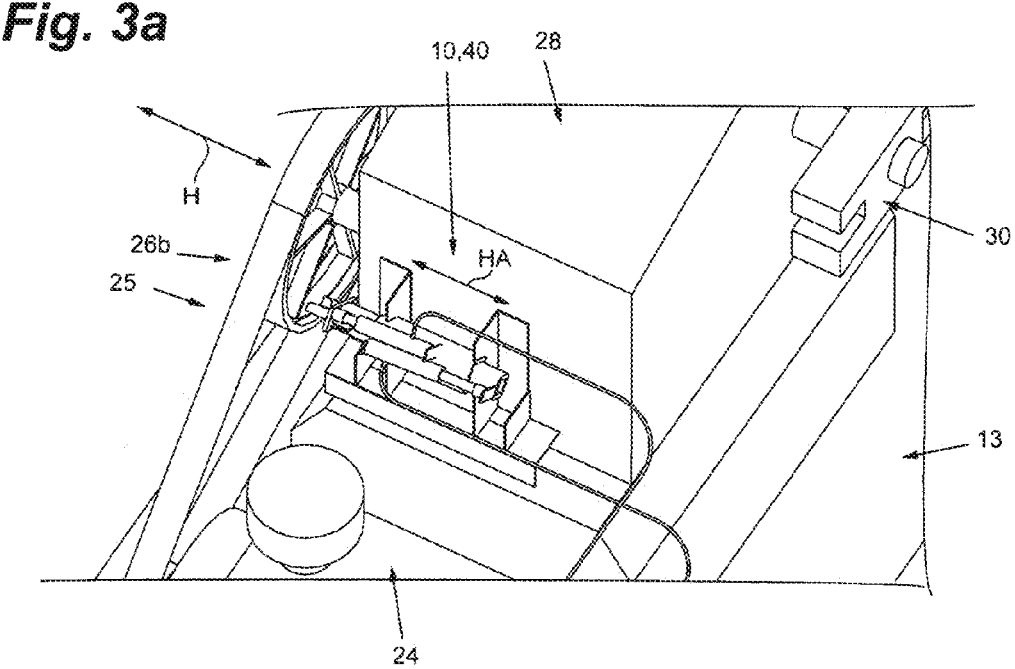
FIGS. 3a and 3b are top perspective views of the embodiment of the safety lock device of FIG. 1a, shown mounted on a conventional pump-jack, with the safety lock device being in the unlocked and locked positions respectively.
Figure 3B:
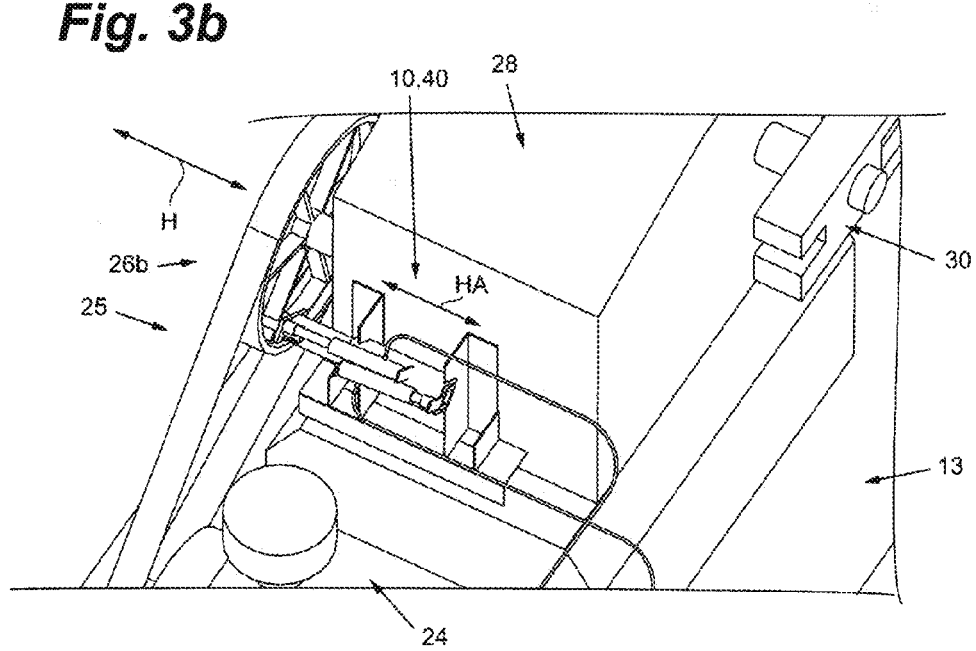
Figure 4A:
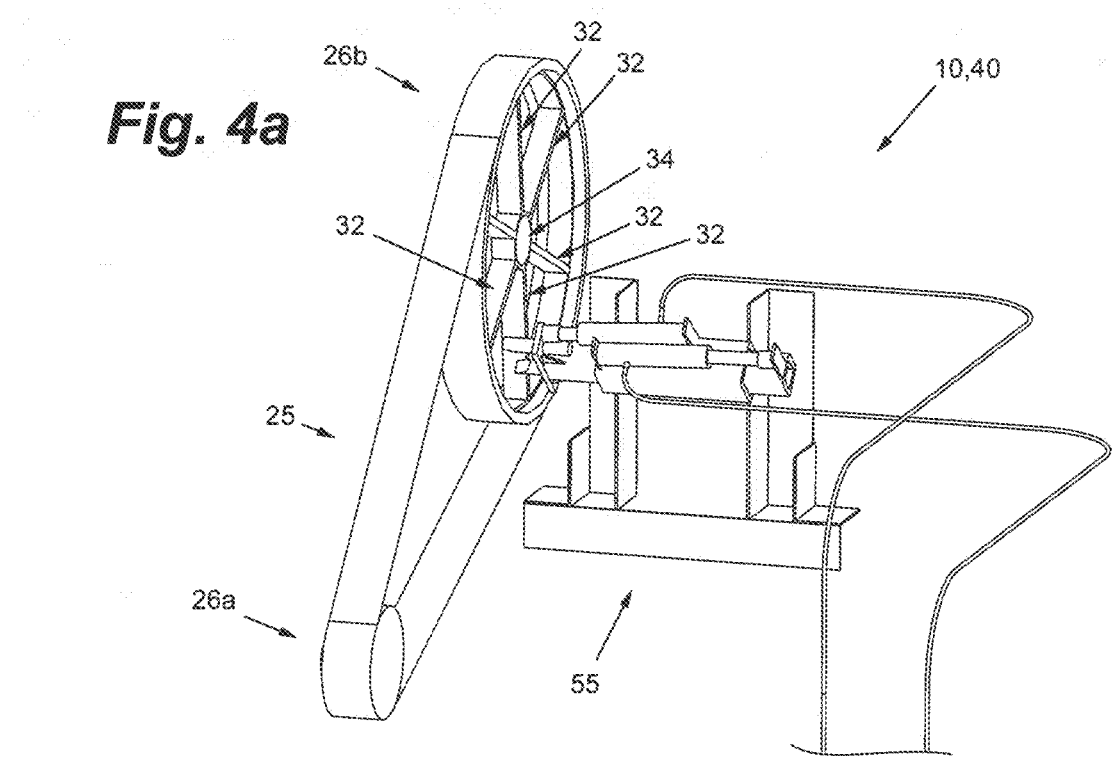
FIGS. 4a and 4b are front perspective views of the embodiment of the safety lock device of FIG. 1a, shown adjacent a forked sheave of a conventional pump-jack, with the safety lock device being in the unlocked and locked positions respectively.
Figure 4B:
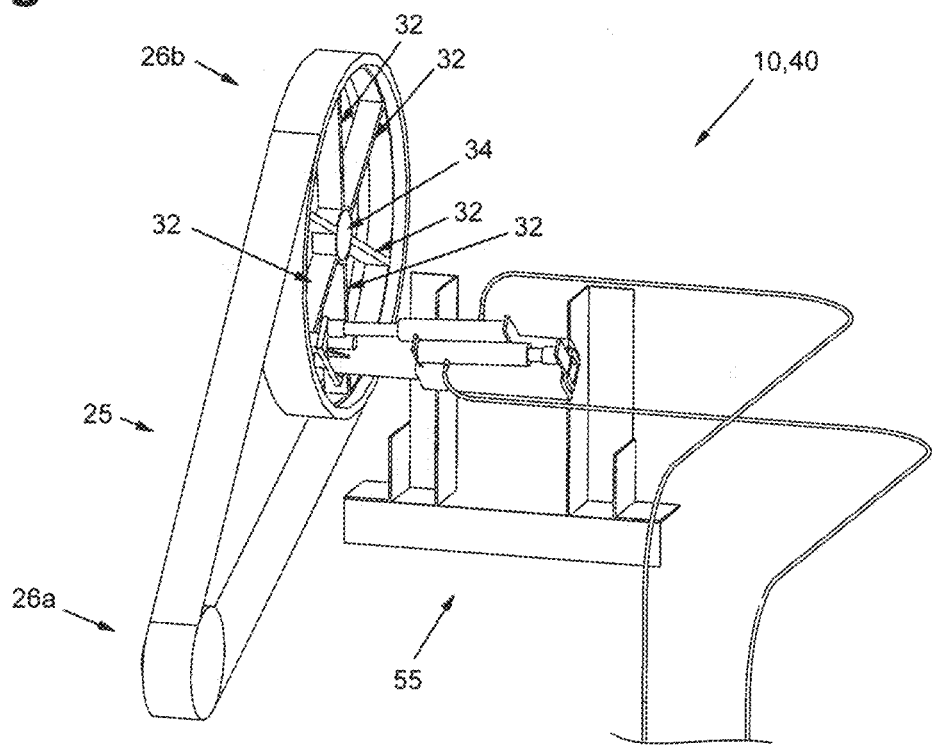
Figure 5A:
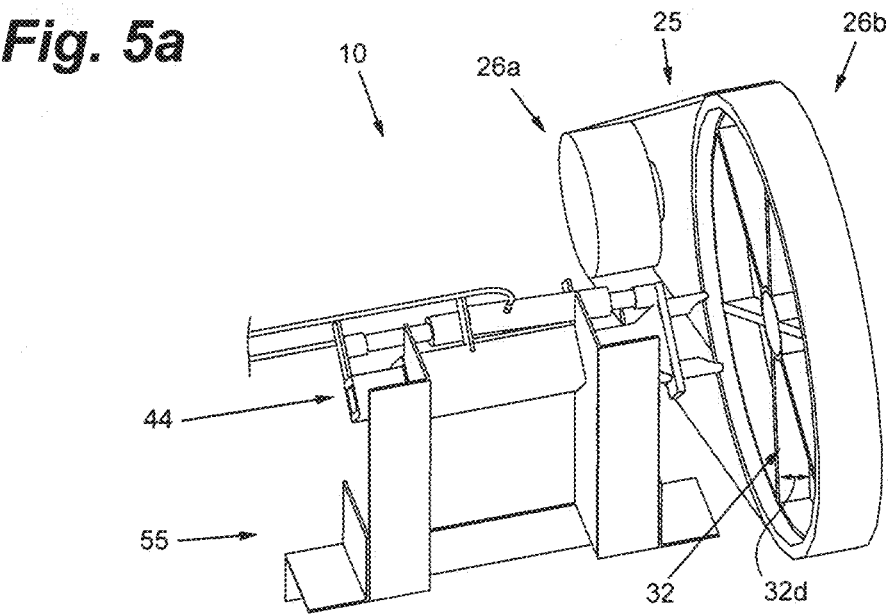
FIGS. 5a and 5b are rear perspective views of the embodiment of the safety lock device of FIG. 1a, shown adjacent a forked sheave of a conventional pump-jack, with the safety lock device being in the unlocked and locked positions respectively.
Figure 5B:
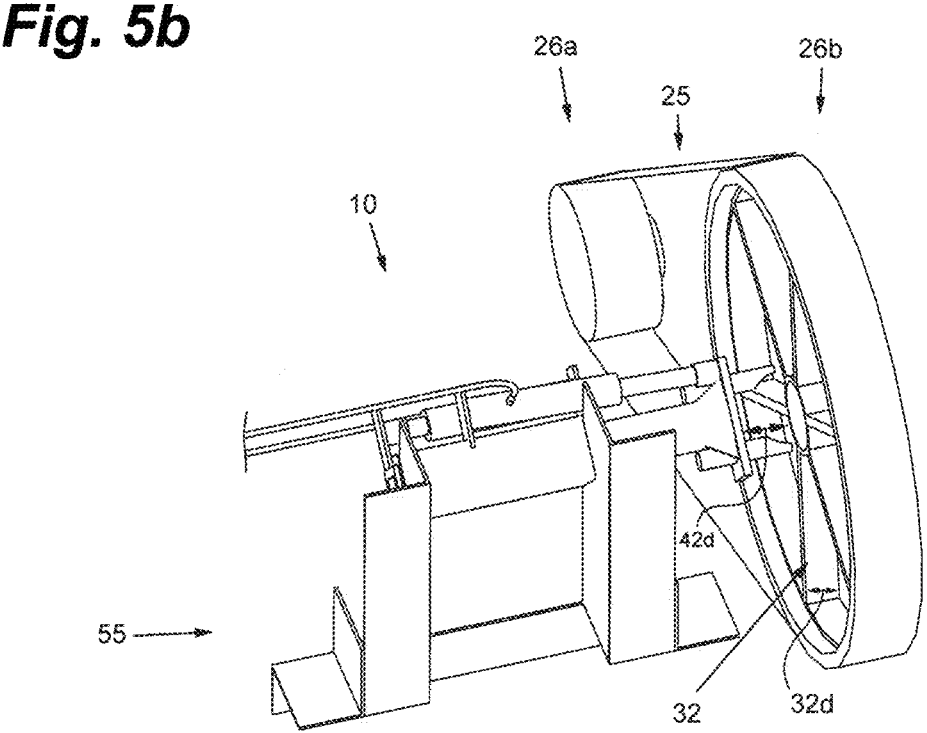
Figure 6A:
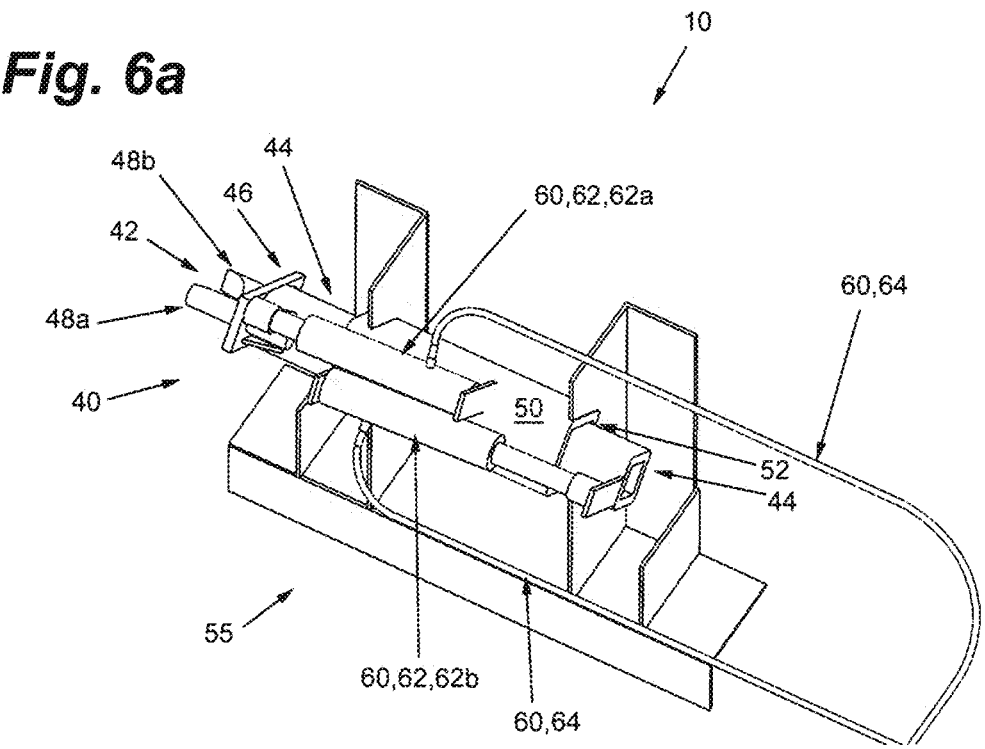
FIGS. 6a and 6b are top rear perspective views of the embodiment of the safety lock device of FIG. 1a, with the safety lock device being in the unlocked and locked positions respectively.
Figure 6B:
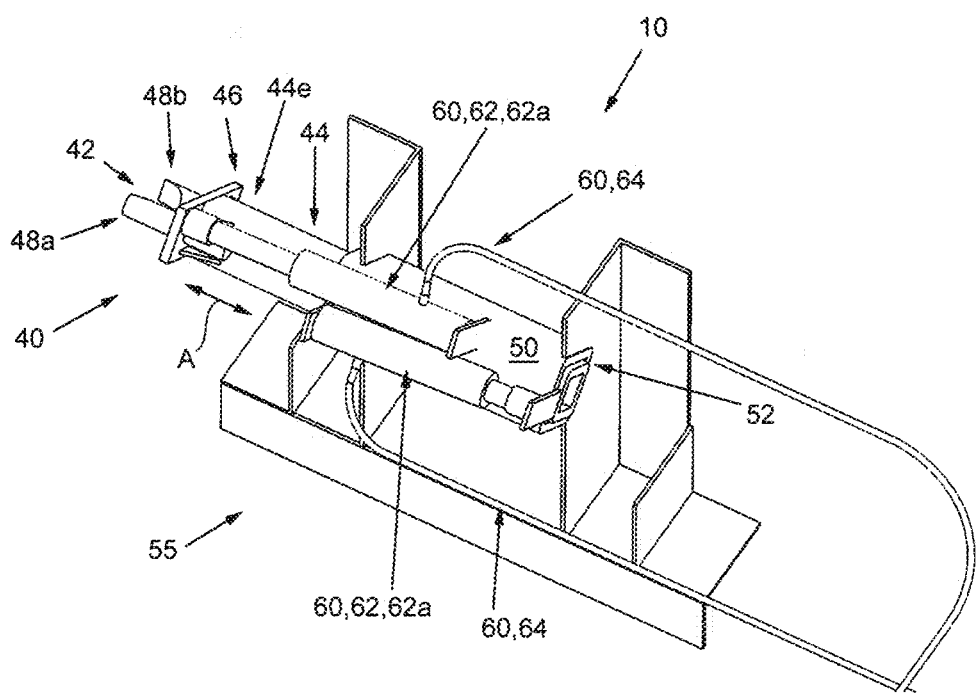
Figure 8A:
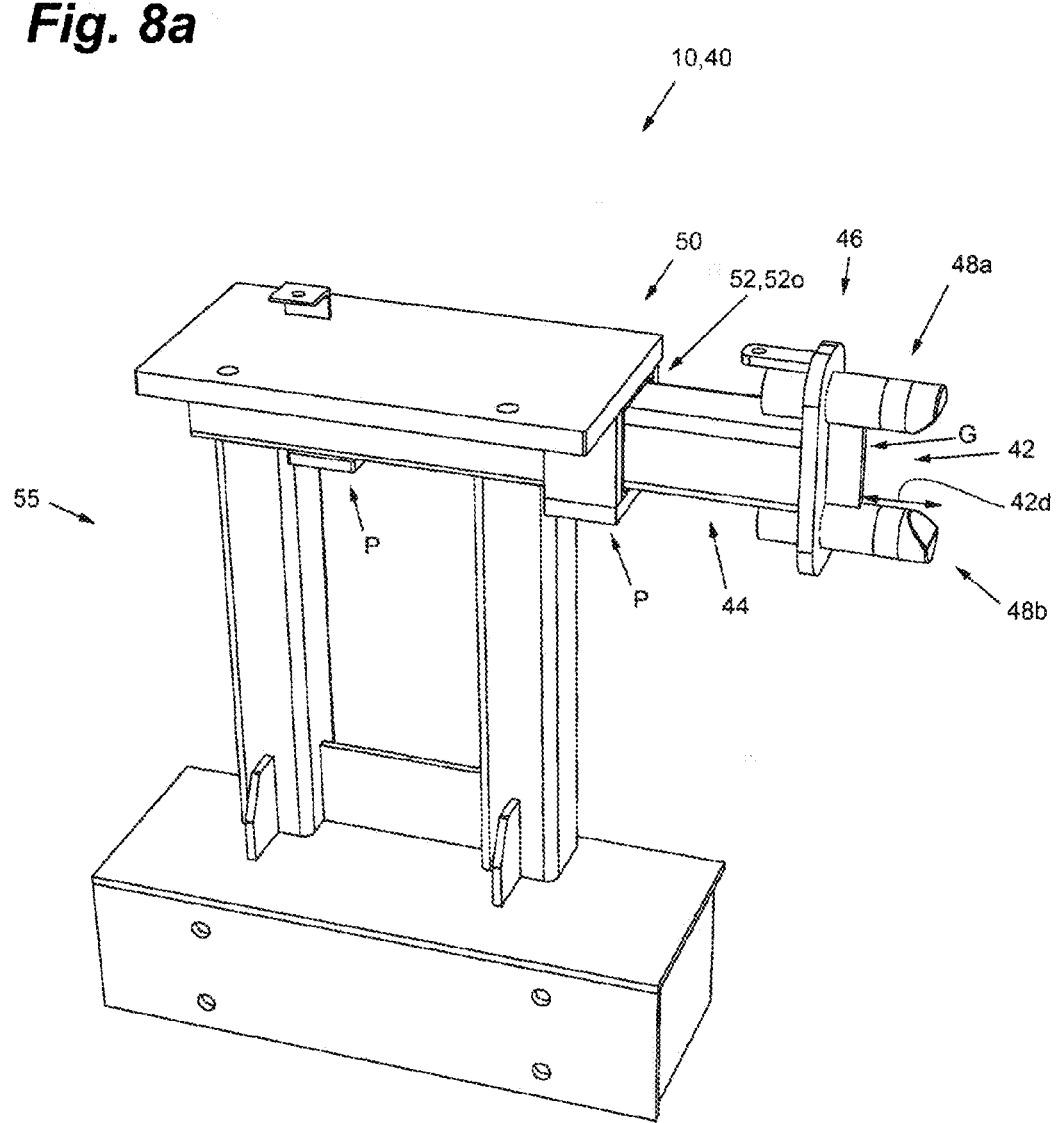
FIG. 8a is a front perspective view of another embodiment of a safety lock device of the present invention.
Figure 8C:
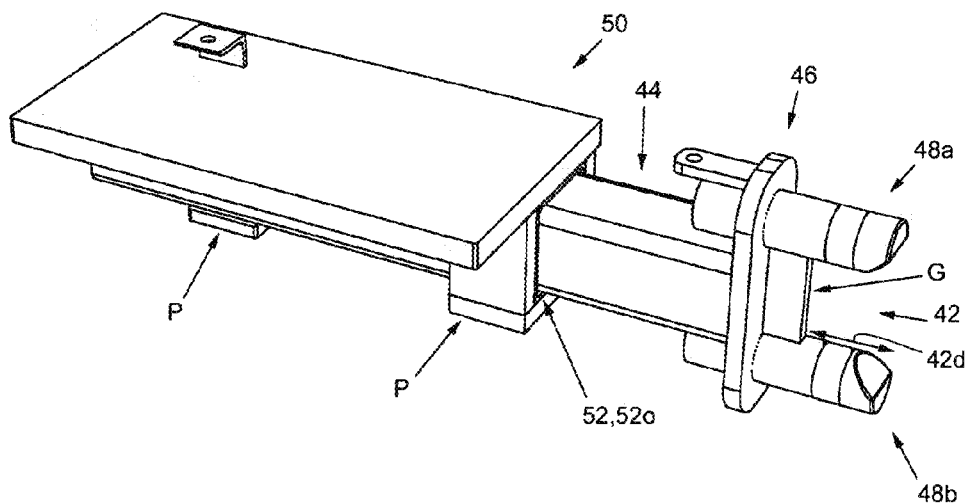
Figure 8D:
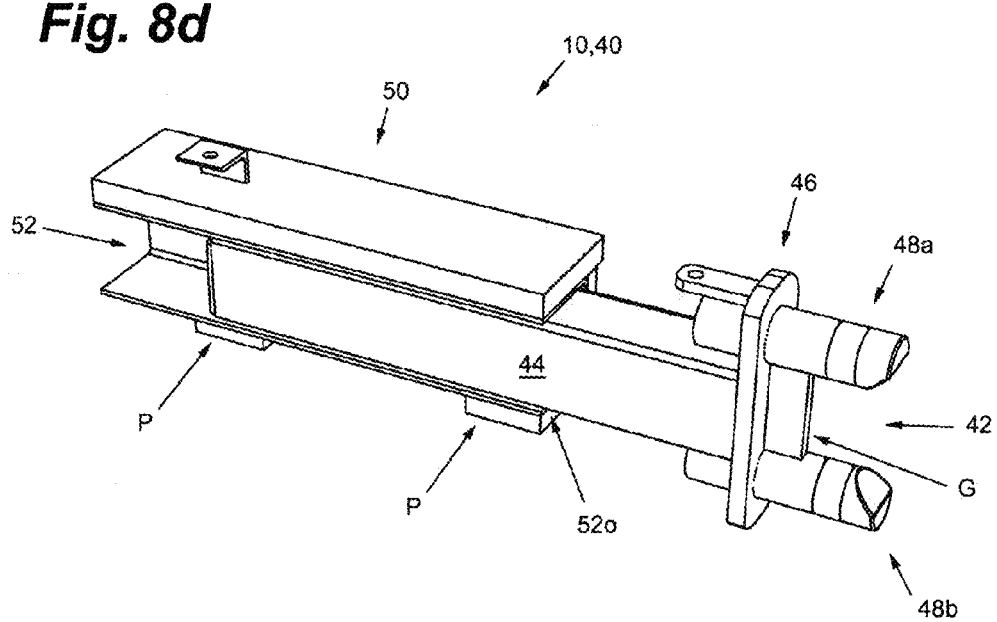

The following description is of preferred embodiments by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

A first preferred embodiment of the safety lock device 10 of the present invention is shown in FIGS. 1a-7 and is designed to be installed on a pump-jack, such as that which is represented in FIGS. 1a-3b, generally designated by the numeral 12. As is conventional, pump-jack 12 comprises a frame 13 and further includes a walking beam 14 pivotably supported above the frame 13 by a samson post 16 for pivotal movement about a generally horizontal axis defined by a center bearing assembly or saddle bearing 18. The beam has a pitman assembly or crank rods 20 connected to the beam 14 at one end 15. The pitman assembly 20 is driven to cause the beam 14 to oscillate or pivot in a vertical plane about the transverse horizontal axis of the saddle bearing 18. The other end 17 of the beam 14 has a horsehead 22 connected thereto. The horsehead 22 is of conventional construction and has cables, a bridle, hanger assembly or other well pumping tools (not shown) connected thereto.

The pitman assembly 20 is driven by a motor 24 or prime mover adjacent one end of the frame 13. Motor 24 runs a belt 25 over a set of pulleys or sheaves 26a, 26b to power the gear box or transmission 28 which drives a pair of cranks 30, generally with counterweights 31 on them to assist the motor 24 in lifting the heavy string of rods. Sheave 26b is mounted at one the side of the gear box 28 via axle 28a and typically comprises a plurality of spokes 32, i.e. it is a spoke-type sheave having a hub 34 and a sheave surface extending out from the hub 34 in spaced and spoked relationship about the circumference of the pulley's rim 27. Alternatively, the pulley or sheave 26b may be a web-type sheave not having discrete spokes, but having one or more through-openings in the sheave surface (typically, circular holes; see FIGS. 10a, 10b for example). Axle 28a generally rotates about a substantially horizontal axis of rotation H, said axle 28a being off-set but substantially parallel to the horizontal axis of the saddle bearing 18. A safety drum brake (not shown) may be attached to axle 28a, for braking of the pump-jack, as the axle 28a passes through gear-box 28 and exits at a side opposite to that of sheave 26b (said exiting portion not shown). That is, axle 28a is common to the sheave 26b on the gear-box 28 and to the safety drum brake, i.e. with the sheave 26b on one side of the gear-box 28 and the brake drum attached to the axle 28a at the other side of the gear-box 28.

All of the aforementioned structure except for the safety lock device 10 is conventional and forms no particular part of the present invention except for the association of the safety lock device 10 therewith.

The safety lock device 10 of the present invention is configured to securely engage at least one of the pulleys or sheaves 26a, 26b, or the circular rotating drum component of a brake drum (not shown) of a conventional pump-jack 12. The safety lock device 10 of the present invention is further configured to actuate, preferably along a substantially horizontal axis HA, between: (i) a locked position, wherein it securely engages at least one of the spokes 32, or wherein it passes through at least one of the holes in the web of the sheave or the circular rotating drum component of a brake drum, so as to prevent any further substantial rotation of the respective sheave or drum brake, and (ii) an unlocked position, wherein it allows for unhindered (conventional) operation and rotation of the sheaves and drum brake. As such, the safety lock device 10 of the present invention preferably further comprises actuation means 60 to actuate the safety lock device 10 between said locked and unlocked position.

In a first preferred embodiment, as illustrated in FIGS. 1a-7, the safety lock device 10 comprises an engagement member 40 having a spoke slot or spoke channel 42 suitable to accommodate one or more of the spokes 32 sheave 26b therein. The spoke channel 42 is of suitable dimensions to securely engage at least one spoke 32 so as to prevent any further substantial rotation of the entire sheave 26b when in the locked position, with the preferred embodiment configured to engage any one of the spokes 32 of the gear box sheave 26b (in conventional pump-jacks the sheaves typically have spokes that are substantially identical in dimensions). Preferably, the spoke channel 42 accommodates a spoke 32 at a slightly greater depth 42d than the depth 32d of the spoke 32; although this is not necessary. Advantageously, because the sheaves 26a, 26b are operationally connected to the various moving and rotating parts of a pump-jack (such as the cranks 30 or horse-head 22), i.e. via gear-box 28, by preventing any further substantial rotation of said sheave 26b, the remainder of the moving parts of the pump-jack are likewise prevented from moving. More advantageously, because the engagement member 40 passes through the sheave and directly engages, and block rotation of, the sheave, it does not have the risk of slippage as would be the case with a drum brake that uses friction.

In the embodiment of FIGS. 1a-7 the engagement member 40 comprises a longitudinal sliding member 44 having a longitudinal axis A, an end member 46 at one end 44e of the longitudinal member 44 and a pair of pins 48a, 48b projecting, substantially parallel to the longitudinal axis A, from the end member 46, said pin 48a, 48b forming the spoke channel 42 therebetween (as more clearly shown in 5a-7). The engagement member 40 of this embodiment further comprises a sliding member mount 50 having an internal passage 52 with an open end 52o. Sliding member 44 and sliding member mount 50 are configured to have sliding member 44 slideably fit through open end 52o for longitudinal sliding movement within the internal passage 52, thereby actuating safety lock device 10 between the locked and unlocked positions.

The safety lock device 10 of the embodiment of FIGS. 1a-7 further comprises a mounting frame 55 for mounting the safety lock device 10 to the gear box 28 in a conventional manner so as to allow the engagement member 40 to actuate between the locked and unlocked positions, preferably with longitudinal axis A being substantially parallel to horizontal axis HA. In this embodiment, mounting frame 55 mounts to the rear portion of the gear box 28 (as shown in FIGS. 1a-3b). Those skilled-in-the-art will now understand that the mounting frame 55 can be modified and adapted to mount on whatever model of pump-jack 12 may be desired, and that the engagement member 40 may also be mounted on other parts of the gear-box 28, such as on the top thereof.

Preferably, the various components of the invention 10, such as the engagement member 40 and mounting frame 55, are made of metal, steel or any other suitable material that provides adequate strength, durability and rigidity to support the various loads that may be encountered when blocking or stopping the rotation of a pump-jack sheave.

The actuation means 60 of the embodiment of FIGS. 1a-7 further comprises at least one hydraulic ram cylinder 62 mounted adjacent the engagement member 40, suitable lengths of hydraulic lines 64 so as to position one or more hydraulic pumps 66 away from the pump-jack 12 and outside the rotation area. In this embodiment, there are two hydraulic ram cylinders 62a, 62b, one for moving the engagement member 40 into the locked position and the other for moving the member 40 into the unlocked position. Likewise, in this embodiment, there are two sets of hydraulic lines 64a, 64b and two sets of hydraulic pumps 66a, 66b, each of these sets associated with one of said cylinders 62a, 62b in a conventional manner. In another embodiment (not shown) there is a single hydraulic cylinder, capable of moving the engagement member 40 into both the locked and the unlocked position, said single cylinder associated with a single hydraulic line and a single hydraulic pump.

Those skilled in the art will now also appreciate that the actuation means 60 could be based on an electric motor, controlled outside of the rotation area. However, the gearing, control circuits and power supply associated with such electric motors will generally be more complex than the hydraulic actuation mean 60 of the embodiment of FIGS. 1a-7.

Other Embodiments

In FIGS. 8a-8d another embodiment of the invention 10 is shown. This embodiment is similar to the embodiment of FIGS. 1a-7, but the engagement member 40 is mounted on top of the mounting frame 55 (rather than on the side as in FIGS. 1a-7) and further comprises additional gusset plates G and stress support plates P put in strategic locations to allow the invention to safely and securely prevent the rotation of a sheave in larger pump-jacks without the engagement member 40 and/or mounting frame 55 having to utilize overly thick and bulky metal and steel components.

Figure 9A:
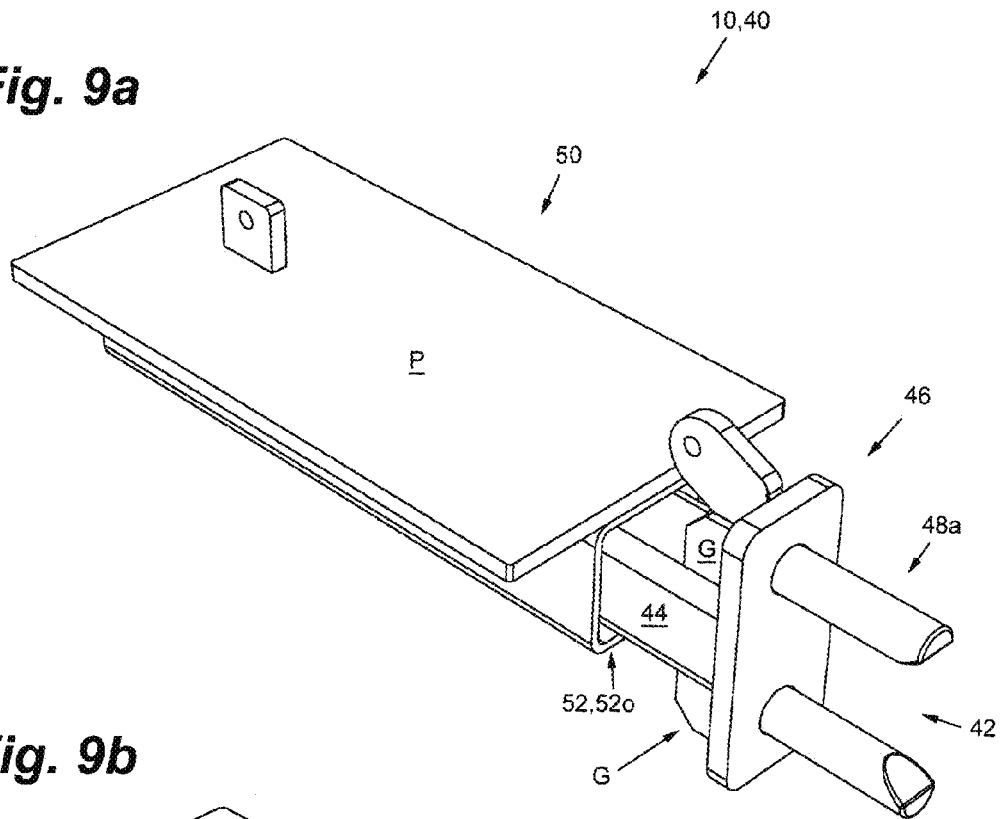
FIGS. 9a and 9b are rear and rear-sectioned perspective views of components yet another embodiment of the safety lock device of the present invention.
Figure 9B:
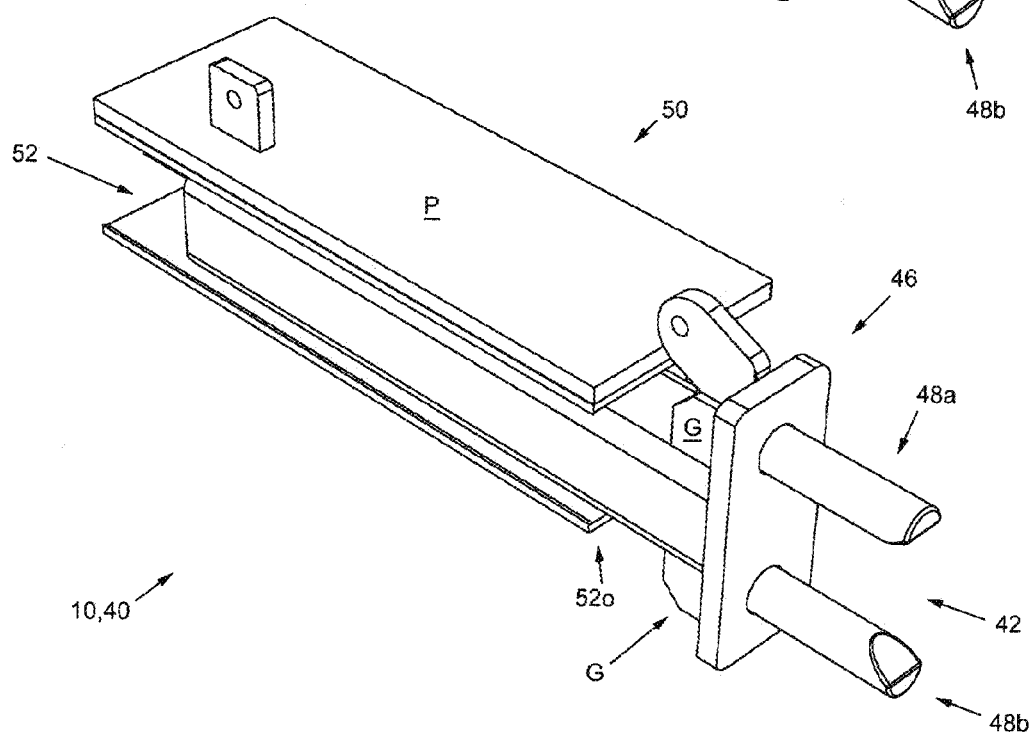

Likewise, the embodiment of the invention 10 illustrated in FIGS. 9a-9b is similar to the embodiment of FIGS. 8a-8d in that it too is contemplated for mounting on top of a mounting frame (not shown) and that it too has various additional gussets G and stress support plates P in strategic locations to allow the invention to safely and securely prevent the rotation of a sheave in larger pump-jacks without the engagement member 40 and/or mounting frame 55 having to utilize overly thick and bulky metal and steel components.

Figure 10A:
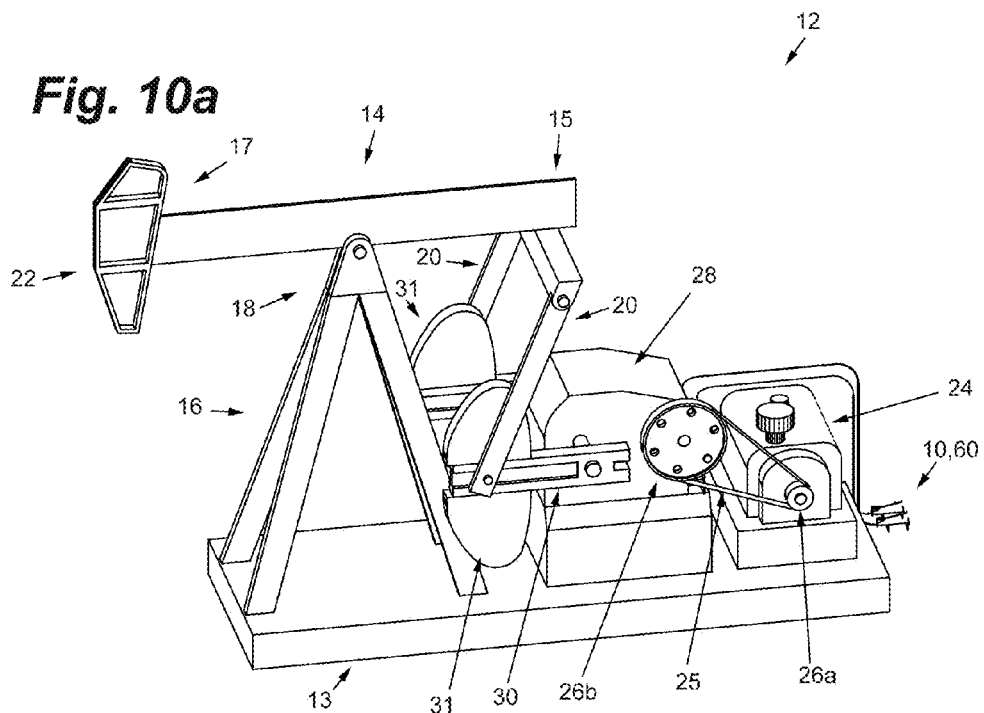
FIGS. 10a and 10b are perspective views of a conventional pump-jack and illustrating yet another embodiment of the safety lock device mounted thereon.
Figure 10B:
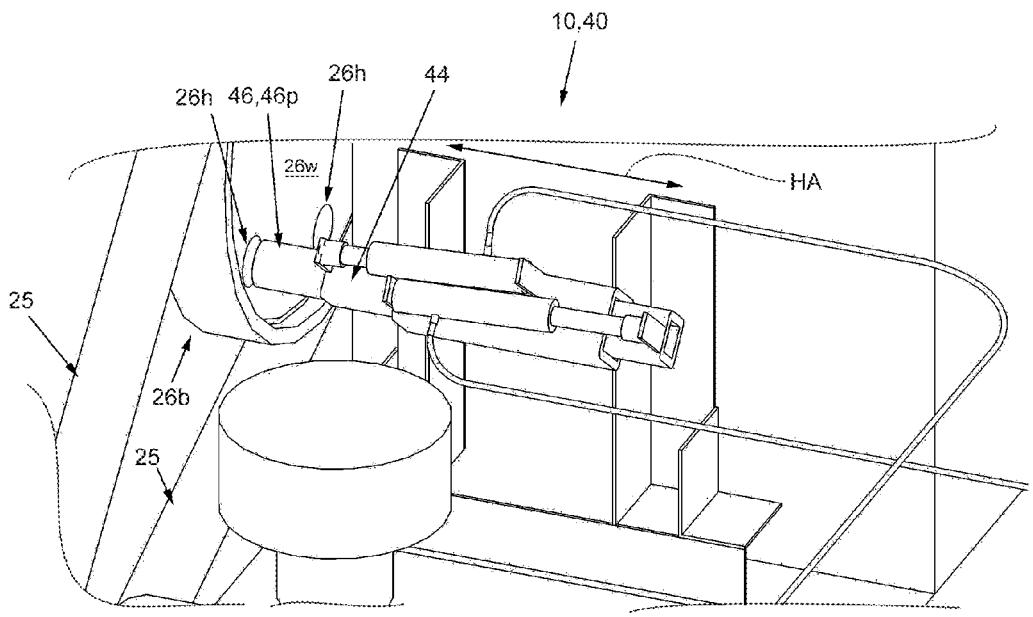
Figure 10C:
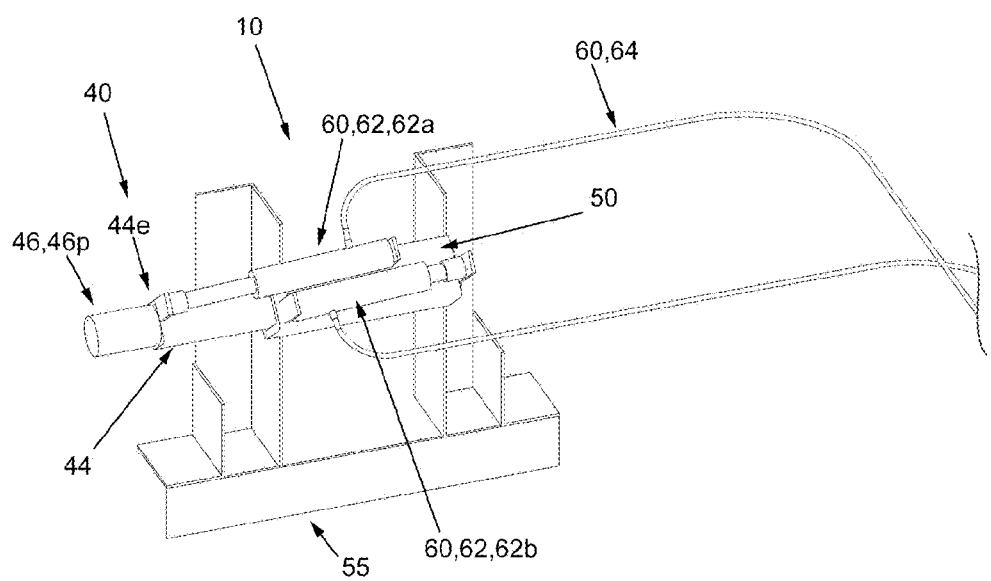

In yet another embodiment, shown in FIGS. 10a-10c, the safety lock device 10 is similar to the embodiment of FIGS. 1a-7, in that the engagement member 40 also comprises a longitudinal sliding member 44 having a longitudinal axis and an end member 46 at one end 44e. However, instead of a pair of pins projection from end member 46, end member 46 in this embodiment is shaped as a single pin 46p projecting from end 44e substantially parallel to the longitudinal axis. This single pin 46p is of suitable dimensions to pass through at least one hole 26h in the web 26w of a sheave 26b so as to prevent any further substantial rotation of such sheave 26b when in the locked position.

In yet another embodiment, not shown and also similar to the embodiment of FIGS. 10a-10c, the engagement member 40 again comprises a longitudinal sliding member having a longitudinal axis and an end member at one end 44e, with end member being shaped as a single pin projecting from the end substantially parallel to the longitudinal axis. In this embodiment, the single pin is of suitable dimensions to pass through at least one hole in the web of a drum brake (rather than a sheave) so as to prevent any further substantial rotation of such drum brake when in the locked position.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The embodiments of the invention in which an exclusive property or privilege is being claimed are defined as follows:

1. A safety lock device, for use with a pump jack having a gear box and at least one rotating member having spokes, said safety lock device comprising:
   an engagement member suitable for securely engaging at least one spoke of the rotating member to prevent further substantial rotation of said rotating member; and
   a mounting frame to mount the safety lock device to the gear box;
   wherein the engagement member may be actuated between a locked position and an unlocked position; and
   wherein said engagement member further comprises:
   a spoke channel suitable to securely engage at least one spoke of the rotating member, when in the locked position, so as to prevent any further substantial rotation of the rotating member.

2. The safety lock device of claim 1 wherein the rotating member is a sheave.

3. The safety lock device of claim 2 wherein the engagement member further comprises:
   a longitudinal sliding member having a longitudinal axis;

an end member at one end of the longitudinal sliding member;

a pair of pins projecting, substantially parallel to the longitudinal axis, from the end member, wherein said pair of pins form the spoke channel therebetween.

4. The safety lock device of claim 3 further comprising actuation means.

5. The safety lock device of claim 4 wherein the pumpjack defines a rotation area and wherein the actuation means further comprises:

at least one hydraulic ram cylinder mounted adjacent the engagement member;

one or more hydraulic pumps to actuate said at least one hydraulic ram cylinder to move the engagement member between the locked position and the unlocked position; and suitable lengths of hydraulic lines, so as to position the one or more hydraulic pumps outside the rotation area.

6. The safety lock device of claim 5 wherein the pumpjack defines a rotation area and wherein the actuation means further comprises an electric motor controlled outside of the rotation area.

7. The safety lock device of claim 2 wherein the spoke channel accommodates the spoke at a slightly greater depth than the depth of the spoke.

8. The safety lock device of claim 1 further comprising actuation means.

9. The safety lock device of claim 8 wherein the pumpjack defines a rotation area and wherein the actuation means further comprises:

at least one hydraulic ram cylinder mounted adjacent the engagement member;

one or more hydraulic pumps to actuate said at least one hydraulic ram cylinder to move the engagement member between the locked position and the unlocked position; and suitable lengths of hydraulic lines, so as to position the one or more hydraulic pumps outside the rotation area.

10. The safety lock device of claim 8 wherein the pumpjack defines a rotation area and wherein the actuation means further comprises an electric motor controlled outside of the rotation area.

* * * * *